H. H. WEBSTER.
Grain Drill.
No. 52,500.  Patented Feb. 6, 1866.
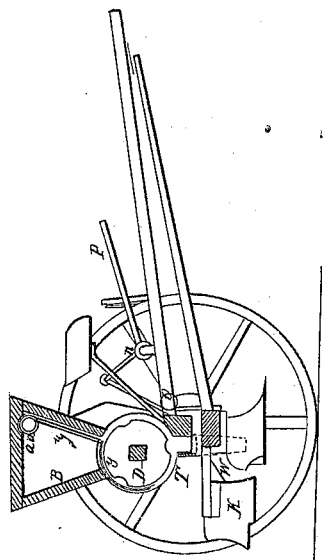
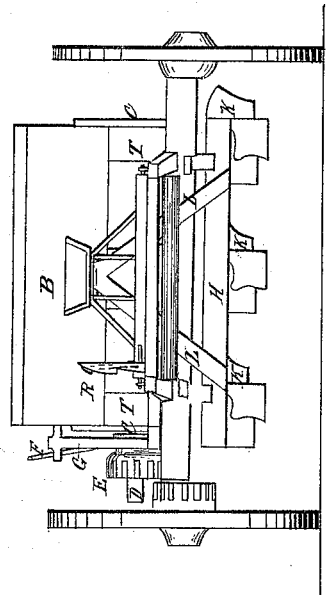
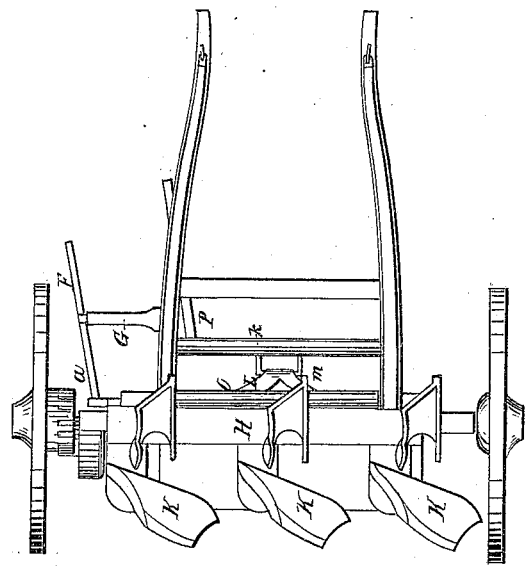
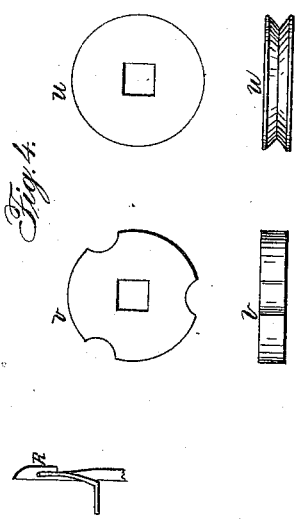
Witnesses:
Inventor:

UNITED STATES PATENT OFFICE.

HORACE H. WEBSTER, OF CLAREMONT, NEW HAMPSHIRE, ASSIGNOR TO HIMSELF AND SYLVESTER DAVIS, OF SAME PLACE.

IMPROVEMENT IN PLANTERS AND SEEDERS.

Specification forming part of Letters Patent No. 52,500, dated February 6, 1866.

*To all whom it may concern:*

Be it known that I, HORACE H. WEBSTER, of Claremont, in the county of Sullivan and State of New Hampshire, have invented a new and useful Improvement in Corn-Planters and Seed-Drillers combined; and I do hereby declare that the following is a full, clear, and exact description of the construction and operation of the same, reference being had to the annexed drawings, and to the letters of reference and figures of reference marked thereon.

The nature of my invention consists in combining in one machine such devices as adapt it for use either as a planter of corn or other seeds in hills or a sower of grain in drills or rows.

To this end I construct a carriage with two wheels, axle, and shafts, as represented on Figure 2 of the drawings. It also has a driver's seat, as the drawings show.

The wheel-hub of the carriage on the right of the driver's seat is constructed with cogs on the inside end thereof, as shown at A on Fig. 2.

On the axle, between the points where the carriage-shafts are united thereto and the wheels, I attach a removable seed-box or hopper. (Marked B.) It is fastened to the axle by two firm standards, C, one on each end. These standards are attached firmly to the hopper at their upper ends, and their lower ends are cut out so as to form a rest or shoulder upon the axle. The sides of these standards which extend down the side of the axle are fastened thereto by bolts, nuts, and screws, which may be easily unfastened and thereby the hopper be removed.

Passing through these standards C, and revolving therein, I place the square shaft D. It is rounded in those parts which rest in the standards to allow it to revolve. On the end of said square shaft, to the right of the driver's seat, I attach a sliding cog-wheel, E. The center of this cog-wheel is square, and adapted to the size of the shaft on which it slides. I slide this cog-wheel upon the shaft, so that its cogs shall mesh with the cogs on the hub of the carriage-wheel, by means a lever, F, one end of which is attached to said cog-wheel and the other rests upon an upright stanchion to the carriage-shafts. (Marked G.) The fulcrum of said lever is formed by a bolt which is attached thereto, and also to a projecting arm on the right-hand standard C. This lever F enables me also to slide the said cog-wheel out of gear whenever I desire so to do.

My plows are arranged on a bar, H, which is placed parallel with the axle and immediately below it. In the spaces left between the plows on said bar I affix lateral beams or projections, to which I attach the coverers K. To the front side of bar H, I fasten two lower or false shafts, which extend therefrom to a point near the front end of the main shafts of the carriage, where and to which they are attached by hooks and swivels.

I also fasten two strong leather straps (marked L) to the front side of the bar H, near the point of junction with the said false shafts. These straps extend upward on an angle approaching each other until they unite at a point a few inches above the axle. At the point of junction I pass them severally around an iron staple, M, which is secured to the roller N, as shown in Figs. 1 and 2. This roller N is fastened at each end thereof by its gudgeons, which rest in staples on the upper side of the main shaft.

O is a roller, fixed in the main shafts near the axle. Its office is to hold the straps L securely in their places, and is arranged to rotate in order to overcome the friction of the moving straps when the plows and coverers are raised.

P is a lever, fastened at its lower end to the roller N, and is used at will, in combination with the rollers N and O, straps L, and the said false shafts, to raise the plows and coverers from the ground whenever it may be desired so to do.

On the right side of the cross-bar that unites the main shafts of the carriage I attach an upright standard. (Marked R.) This standard has a notch cut in its outer side to form a shoulder, in which the lever P is made secure when the plows and coverers are raised, and serves to hold them suspended from the earth as long as I desire.

Fig. 5 is a trigger in the form of an elbow-lever, to be worked with the foot. The Fig. 5 shows it in conjunction with the standard R, above described. The upper end of this trigger is fastened to the upper end of the standard R by a bolt, upon which it swings, and the lower end, turned inward, serves as a pedal for the driver's foot. Its office is to enable the driver to throw the lever P from the notch in the standard R by the use of the foot only, and thereby lower the plows and coverers to the ground whenever he shall wish so to do.

The plows on my machine are placed on the lower cross-bar under the axle, and they are attached to said bar by bolts, nuts, and screws, or other suitable means, so arranged as to render their removal and adjustment a matter of ease. I also attach the coverers (marked K) to arms extending laterally from said lower cross-bar. These coverers are arranged on an angle with the plows, and serve not only to cover up the seed sown, but also to brush away from the line of the drills or hills all large stones and hard lumps of clayey earth.

I construct my seed-hopper in the usual form, with various compartments corresponding with the number of the grooved and notched wheels and drums on the shaft C, as hereinafter described, and one side of each of said compartments is set on an angle, so as to leave the bottom of such compartment small and the top thereof large and flaring.

On the square shaft D, at suitable distances from each other, I place drums. (Marked T on the drawings.) Inside of these drums respectively, and attached firmly to said square shaft, I place grooved wheels U on Fig. 4 or notched wheels V on the same figure. When my machine is used for sowing grain these grooved wheels serve to convey the seeds in regular quantities and deposit them in the drills made by the plows, and when used for planting in hills the notched wheels serve to deposit the seeds in suitable parcels and at regular intervals in such drills. I also attach conduits W to the bottom of the drums to receive the seed from the notched or grooved wheels and convey it to the drills.

At the bottom of each compartment of the hopper, which is left open, and immediately over the notched wheels, I place valves Y. These are made of sufficient length and width to cover the upper surfaces of said notched wheels, and are bent on a circle to correspond therewith. They are attached at one end to a lever or spring, Z, which, in turn, is attached to the cross-bar a a, and extends across the top of the hopper lengthwise. The ends of these valves, which are attached to said lever or spring, are curved in such a form as to cause them to catch in the sides of the notches in the wheel as the wheel revolves. Whenever the revolution of the said wheels has carried the valves to such a distance along the surfaces thereof that the curved ends are released from the notches, the springs or levers Z immediately force them back to their original position. Thus when the revolution of the notched wheel carries the valve along with it a notch is opened into which the seed for planting is allowed to run, and when the valve is released from the notch by which it is carried it is forced back to its original position with such force and accuracy as to shut off all seed in the hopper that has not already entered into such opened notch. When said wheel has made half a revolution the seed is released and conveyed by the conduit W into the drill left by the plow, and is covered up by the coverers. The distance between the hills to be planted is regulated by the number of notches on said notched wheels.

It will readily be perceived that by my device seed can be planted only when the carriage is moved forward, inasmuch as when the carriage is backed the valves Y keep the notches in the wheels closed and allow no seed to enter therein.

The mode of operating my machine is as follows: When I desire to plant seeds in hills I attach a hopper and square shaft to the axle by the bolts, nuts, and screws above described and the proper number of plows on the lower cross-bar. The square shaft must carry the notched wheels V, and the number of coverers must correspond with the number of plows to be used. The valves Y must also be in their places. I then place my seed to be planted in the various compartments of the hopper and mount the driver's seat. I next place my foot upon the trigger, Fig. 5, and lower the plows and coverers by forcing the lever P from its rest in the standard R. I next take hold of the lever F, and therewith slide the cog-wheel E outward on the square shaft until its cogs mesh with the cogs on the hub of the carriage-wheel, and I make said cog-wheel secure there by fastening the lever F in a notch on the inner side of the upright standard C. I next set the carriage in motion. The seed for planting passes into the notches on the various notched wheels, is emptied by said wheels, as they revolve, into the conduit W, and by it conveyed into the drills made by the plows. Lastly, the coverers, working in a diagonal manner corresponding to thier shapes, cover the seeds well with earth, and at the same time remove all large stones or lumps of earth from the line of the hills thus planted.

Whenever, instead of planting in hills, I desire to sow seeds in drills, I adjust a hopper to the carriage, which is provided with the square shaft D and grooved wheels thereon, instead of the notched wheels above mentioned, and without the valves Y. As the shaft revolves the seed drops into the grooves of the wheels U, and is carried thereby into the conduit W, by which it is sown in regular rows along the drills left by the plows, and covered by the coverers.

What I claim as my invention, and desire to secure by Letters Patent, is—

1. The combination of a corn-planter and seed-drill, substantially as herein described.

2. My device for raising the plows and coverers from the ground and lowering them thereto, substantially as set forth.

3. The valves Y, notched wheels V, and cog-wheel E, constructed, combined, and arranged substantially as described.

HORACE H. WEBSTER.

Witnesses:
J. CLEMENT SMITH,
FRED. B. GINN.